(12) United States Patent
Ozawa et al.

(10) Patent No.: US 9,830,723 B2
(45) Date of Patent: Nov. 28, 2017

(54) BOTH-DIRECTION DISPLAY METHOD AND BOTH-DIRECTION DISPLAY APPARATUS

(71) Applicant: SEIKO EPSON CORPORATION, Tokyo (JP)

(72) Inventors: Takashi Ozawa, Shiojiri (JP); Shun Imai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/547,582

(22) Filed: Nov. 19, 2014

(65) Prior Publication Data

US 2015/0154777 A1 Jun. 4, 2015

(30) Foreign Application Priority Data

Dec. 2, 2013 (JP) ................. 2013-248938
Mar. 24, 2014 (JP) ................. 2014-059804
Apr. 1, 2014 (JP) ................. 2014-075193

(51) Int. Cl.
*G06F 17/00* (2006.01)
*G06T 11/60* (2006.01)
(Continued)

(52) U.S. Cl.
CPC .......... *G06T 11/60* (2013.01); *G06F 3/03542* (2013.01); *G06F 3/04845* (2013.01); *G06F 3/04883* (2013.01)

(58) Field of Classification Search
None
See application file for complete search history.

(56) References Cited

U.S. PATENT DOCUMENTS 6,429,856 B1 * 8/2002 Omura ................. G06F 3/0416
  178/18.09
7,221,355 B1 * 5/2007 Ding .................... G06F 1/3203
  345/156
(Continued)

FOREIGN PATENT DOCUMENTS

JP    A-08-160539    6/1996
JP    A-2002-007071    1/2002
(Continued)

OTHER PUBLICATIONS

Geetesh Bajaj, "Group, Ungroup, and Regroup Shapes in PowerPoint 2011 for Mac", URL: http://www.indezine.com/products/powerpoint/learn/shapes/group-ungroup-regroup-in-ppt2011-mac.html.*

(Continued)

*Primary Examiner* — David H Chu
(74) *Attorney, Agent, or Firm* — Oliff PLC

(57) ABSTRACT

A both-direction display method includes: inputting an image signal from an external device; displaying an image on a screen on the basis of a display signal; detecting an operation for the screen as an image operation; drawing an operation input object corresponding to the image operation; outputting the display signal for displaying a composite image obtained by combining an external image on the basis of the image signal and the operation input object; detecting an interlocking operation; and editing the operation input object so as to follow a change of the external image in accordance with the interlocking operation.

6 Claims, 12 Drawing Sheets

(51) Int. Cl.
*G06F 3/0488* (2013.01)
*G06F 3/0354* (2013.01)
*G06F 3/0484* (2013.01)

(56) References Cited

U.S. PATENT DOCUMENTS

| | | | |
|---|---|---|---|
| 7,266,778 B2* | 9/2007 | Martin | G06F 3/0481 345/157 |
| 8,907,907 B2* | 12/2014 | Kawasaki | G06F 3/03545 178/19.04 |
| 2001/0030668 A1* | 10/2001 | Erten | G06F 3/0304 715/863 |
| 2004/0236830 A1* | 11/2004 | Nelson | H04L 29/06027 709/204 |
| 2007/0044028 A1* | 2/2007 | Dunn | H04N 7/15 715/761 |
| 2007/0220412 A1* | 9/2007 | Muhlhauser | G09B 5/00 715/203 |
| 2008/0024500 A1* | 1/2008 | Bae | G06T 11/203 345/442 |
| 2008/0303794 A1* | 12/2008 | Bolt | G06F 3/0428 345/173 |
| 2012/0162061 A1* | 6/2012 | Hildebrandt | G06F 3/0321 345/156 |
| 2013/0106782 A1* | 5/2013 | Nowatzyk | G06F 3/03545 345/175 |
| 2013/0135263 A1* | 5/2013 | Omura | G06F 3/03 345/179 |
| 2013/0162607 A1 | 6/2013 | Ichieda | |
| 2013/0342494 A1* | 12/2013 | Feng | G06F 3/044 345/174 |
| 2014/0253462 A1* | 9/2014 | Hicks | G06F 3/03545 345/173 |
| 2015/0054791 A1* | 2/2015 | Omura | G06F 3/0418 345/175 |

FOREIGN PATENT DOCUMENTS

| | | |
|---|---|---|
| JP | A-2006-285629 | 10/2006 |
| JP | A-2011-140154 | 7/2011 |
| JP | A-2013-134409 | 7/2013 |
| JP | A-2013-152739 | 8/2013 |

OTHER PUBLICATIONS pptninja, "Tip for Resizing Objects with Text in PowerPoint", URL: http://www.powerpointninja.com/design-tips/tip-for-resizing-objects-with-text-in-powerpoint/.*

* cited by examiner

BOTH-DIRECTION DISPLAY METHOD AND BOTH-DIRECTION DISPLAY APPARATUS

The entire disclosure of Japanese Patent Application No. 2013-248938, filed Dec. 2, 2013, No. 2014-059804, filed Mar. 24, 2014, and No. 2014-075193, filed Apr. 1, 2014 are expressly incorporated by reference herein.

BACKGROUND

1. Technical Field

The present invention relates to a both-direction display method and a both-direction display apparatus.

2. Related Art

A both-direction display apparatus configured to display images on the basis of an image signal input from an external device and images of objects such as characters, drawing, and the like corresponding to an operation for a screen in a composite form is known. Here, an image on the basis of the image signal input from the external device is referred to as an external image, and an object corresponding to the operation for the screen is referred to as an operation input object.

JP-A-2013-152739 discloses a both-direction projector configured to operate in a drawing mode in which an operation input object is drawn on the basis of an operation for a screen and a mode transmitting an operation signal such as a click to an external device on the basis of the operation for the screen (referred to as an external device operating mode).

In the case of presentations or lessons in a school by using a projector, a user may want to write characters or graphics on a projected image for explanation. In this case, there is a method of inputting characters or graphics by operating a pointing device such as a mouse on a screen of a personal computer connected to the projector and configured to input image data.

In JP-2011-140154 discloses an electronic blackboard system configured to allow input of characters or graphics by operating an electronic pen (a pen-type input device) on an image projected on a screen.

JP-A-8-160539 discloses a light blackboard configured to provide an image projecting device configured to project an image from a back surface side of the screen with a predetermined image display at a position of an input of an instruction operation given to a front surface side of the screen. JP-A-8-160539 describes that a drawing control is performed from a pen-type element, and the screen of drawings is erased.

Since the image signal input from the external device to the both-direction projector is a signal for displaying an image drawn by the external device, if the operation for the screen is performed in the external device operation mode, the external image is changed. In contrast, the operation input object is an image drawn by the both-direct ion projector, and is not involved at all by the external device when being processed.

Therefore, in the both-direction projector described in JP-A-2013-152739, even though the external image is changed by the operation for screen performed in the external device operating mode, the operation input object is not changed. Therefore, for example, in the case where an external image indicating a specific slide of an application program and an operation input object indicating a comment corresponding to the specific slide are displayed in a composite form for presentation, when the mode is transferred from the drawing mode to the external device operating mode and a next slide is selected by the operation for the screen, the next page is displayed with a comment which is not related to the next slide. In order to erase the operation input object which is not related to the slide, an operation for erasing the operation input object is disadvantageously required in addition to the operation for selecting the next slide.

When inputting drawings such as characters and graphics (drawing data) on the projected image (image data) with the electronic pen, there is a case that returning to the image before inputting the drawing is wanted for conformation. However, with the apparatus as the electronic blackboard system disclosed in JP-2011-140154, drawing data needs to be specified one by one or selected for erasing these drawings in order to erase these drawings. In addition, in the case of restoring the drawing data after having erased and continuing drawing, a complicated operation such as saving the drawing data in a certain location and calling up the drawing data again is required. The light blackboard of the JP-A-8-160539 is only capable of erasing the drawn images in a lump by the pen-type element and is not capable of restoring the drawing images again after having erased.

SUMMARY

An advantage of some aspects of the invention is to solve at least a part of the problems described above, and the invention may be implemented as the following forms or application examples.

APPLICATION EXAMPLE 1

A both-direction display method according to this application example includes: inputting an image signal from an external device; displaying an image based on a display signal on a screen; detecting an operation for the screen as an image operation; drawing an operation input object corresponding to the image operation; outputting the display signal for displaying a composite image obtained by combining an external image based on the image signal and the operation input object; detecting an interlocking operation; and editing the operation input object so as to follow a change of the external image in accordance with the interlocking operation.

According to this application example, an operation tor editing the operation input object which does not correspond to the external image any longer is not necessary.

APPLICATION EXAMPLE 2

The editing of the operation input object in the both-direction display method according to the application example described above may include erasing the operation input object.

With this configuration, an operation for erasing the operation input object which does not correspond to the external image any longer is not necessary.

APPLICATION EXAMPLE 3

The editing of the operation input object in the both-direction display method according to the application example described above may include enlarging or contracting the operation input object.

With this configuration, an operation to enlarge or contract the operation input object so as to correspond to the size of the object shown by an external image after the change is no longer necessary.

APPLICATION EXAMPLE 4

The editing of the operation input object in the both-direction display method according to the application example described above may include moving the operation input object.

With this configuration, an operation to move the operation input object so as to correspond to a position of the object shown by the external image after the change is no longer necessary.

APPLICATION EXAMPLE 5

The both-direction display method according to the application example described above may further include setting a drawing mode or an external device operating mode, detecting the operation for the screen as the image operation in the detecting the operation for the screen as an image operation in the drawing mode, and detecting a predetermined operation for the screen as the interlocking operation in the detecting the interlocking operation in the external device operating mode.

With this configuration, a user is capable of detecting an identical operation either as the image operation or the interlocking operation in accordance with the the mode, and hence the number of types of the operations may be reduced. Therefore, the both-direction display apparatus having a simple user interface and easy to operate is achieved.

APPLICATION EXAMPLE 6

In the both-direction display method according to the application example described above, a device operation signal corresponding to the interlocking operation may be output to the external device and the operation input object may be edited so as to follow the change of the external image upon detection of the interlocking operation.

With this configuration, the operation input object corresponding to the external image may be combined and displayed easily.

APPLICATION EXAMPLE 7

A both-direction display apparatus according to this application example includes: an image input terminal portion to which an image signal is input from an external device; a display unit that is configured to display based on a display signal an image on a screen; an image operation detection unit that is configured to detect an operation for the screen as an image operation; a drawing unit that is configured to draw an operation input object corresponding to the image operation; an output unit that is configured to output the display signal for displaying a composite image obtained by combining an external image based on the image signal and the operation input object; an interlocking operation detection unit that is configured to detect an interlocking operation; and an interlocking editing unit that is configured to edit the operation input object so as to follow a change of the external image in accordance with the interlocking operation.

According to this application example, the both-direction display apparatus which does not require an operation for editing the operation input object which does not correspond to the external image any longer is achieved.

APPLICATION EXAMPLE 8

In the both-direction display apparatus according to the application example described above, when the interlocking operation is defected, the interlocking editing unit may output a device operation signal corresponding to the interlocking operation to the external device and the operation input object may be edited so as to follow the change of the external image.

With this configuration, the operation input object corresponding to the external image may be combined easily for display.

APPLICATION EXAMPLE 9

In the both-direction display apparatus according to the application example described above, when the interlocking operation is detected, the interlocking editing unit may erase the operation input object so as to follow the change of the external image.

With this configuration, an operation for erasing the operation input object which does not correspond to the external image any longer is not necessary.

APPLICATION EXAMPLE 10

In the both-direction display apparatus according to the application example described above, when the interlocking operation is detected, the interlocking editing unit may enlarge or contract the operation input object so as to follow the change of the external image.

With this configuration, an operation for enlarging or contracting the operation input object so as to correspond to the size of the object shown by an external image after the change is no longer necessary.

APPLICATION EXAMPLE 11

In the both-direction display apparatus according to the application example described above, when the interlocking operation is detected, the interlocking editing unit may move the operation input object so as to follow the change of the external image.

With this configuration, an operation to move the operation input object so as to correspond to a position of the object shown by the external image after the change is no longer necessary.

APPLICATION EXAMPLE 12

The both-direction display apparatus according to the application example described above may further include a control unit that is configured to set a drawing mode or an external device operating mode, wherein the operation for the screen may be detected as the image operation in the drawing mode, and a predetermined operation for the screen may be detected as the interlocking operation in the external device operating mode.

With this configuration, a user is capable of detecting an identical operation either as the image operation or the interlocking operation in accordance with the the mode, and hence the number of types of the operations may be reduced.

Therefore, the both-direction display apparatus having a simple user interface and easy to operate is achieved.

APPLICATION EXAMPLE 13

The both-direction display apparatus according to the application example described above may further include a control unit that is configured to switch a state between a drawing state in which the composite image obtained by combining the external image and the operation input object is displayed, and a non-drawing state in which the operation input object is not combined and only the external image is displayed when the interlocking operation is accepted.

With this configuration, in the case where the interlocking operation is performed when the operation input object such as characters or graphics is drawn with an electronic pen or the like on the external image, the drawing state in which the composite image obtained by combining the operation input object with the external image is projected is switched to the non-drawing state in which only the external image is projected as an image without combining the operation input object. Accordingly, since the image before drawing and the image after drawing can be switched easily in projection without the necessity of a complicated operation, these images can be compared easily.

APPLICATION EXAMPLE 14

In the both-direction display apparatus according to the application example described above, the image input terminal portion may be provided with a plurality of image input terminals, a memory device configured to save the operation input object for each of the plurality of image input terminals may be further provided, and when the interlocking operation is accepted, if the state is the drawing state, the state may be switched to the non-drawing state, and if the state is the non-drawing state, the input terminal may be switched to the next image input terminal, and the state may be switched to the drawing state or the non-drawing state by the external image of the image input terminal and the operation input object.

With this configuration, in the case where the operation input objects corresponding respectively to the external images of the plurality of image input terminals are saved, and the interlocking operation is performed, the display state is switched in the order of the drawing state and the non-drawing state for each of the image input terminals. Accordingly, display of the corresponding operation input object can be switched between the image before drawing and the image after drawing for each of the images from the image input terminals to be projected. Therefore, the images from the respective image input terminals can be compared and confirmed easily. When drawing is not performed, the image input terminals can be switched by the interlocking operation.

BRIEF DESCRIPTION OF DRAWINGS

The invention will be described with reference to the accompanying drawings, wherein like numbers reference like elements.

DESCRIPTION OF EXEMPLARY EMBODIMENTS

Figure 1A:
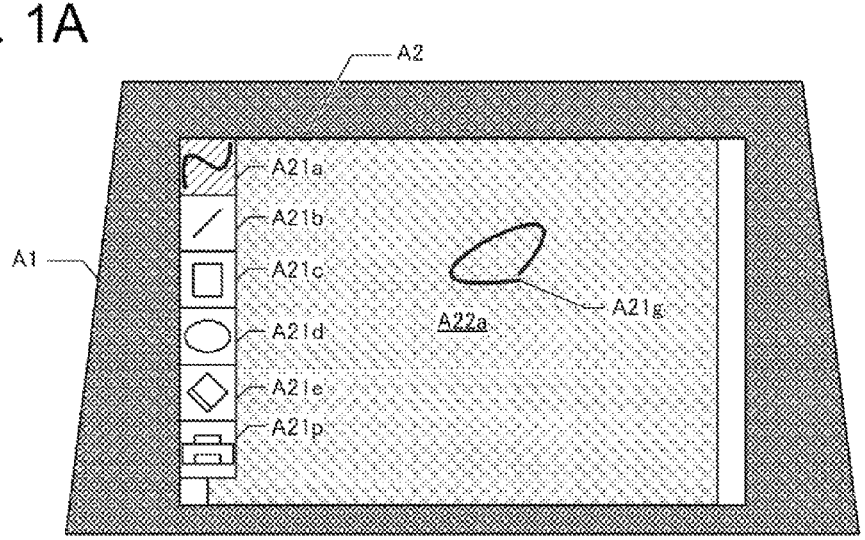
FIGS. 1A and 1B are drawings illustrating screen configuration of a first embodiment.

Referring now to the attached drawings, embodiments of the invention will be described. Components corresponding to the respective drawings are denoted by the same reference numerals and overlapped descriptions are omitted.

First Embodiment

1. Outline

A projector 1 as an embodiment of the invention of a both-direction display apparatus is an apparatus configured to project and display an image on projection surfaces such as a wall, a desk, and a specific screen as a screen. As illustrated in FIG. 1A, the projector 1 projects a window image A2 as a composite image obtained by combining an external image A22a on the basis of an image signal input from an external device such as a PC, or a smart phone, and an operation input object A21g corresponding to an operation for the projection surface.

Figure 1B:
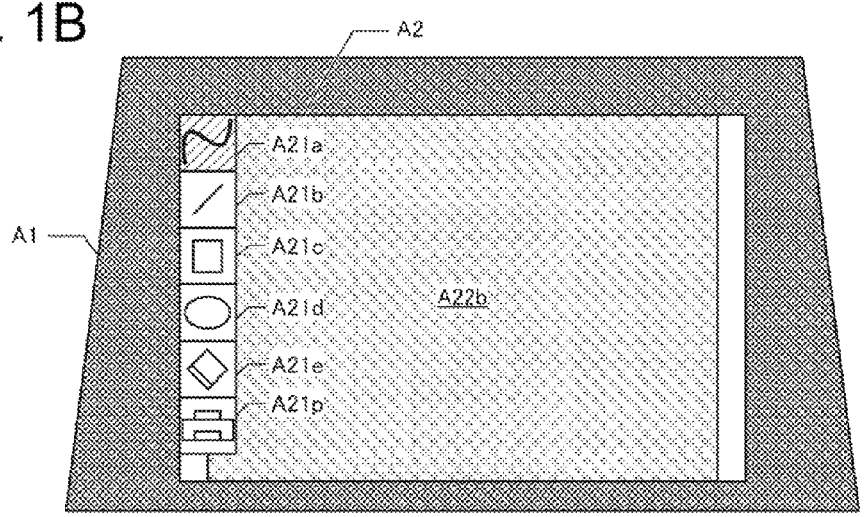

The projector 1 is operated in a drawing mode or an external device operating mode when projecting the external image A22a and the operation input object A21g in a composite form. In the drawing mode, the projector 1 detects the operation for the screen as an operation for editing the operation input object A21g (image operation). When the projector 1 detects the image operation, the projector 1 draws the operation input object A21g in accordance with the detected image operation. In the external device operating mode, the projector 1 detects the operation for the screen as an operation for the external device such as PC (external device operation), and outputs an operation signal corresponding to the external device operation to the external device. In the external device operating mode, the projector 1 detects a specific external device operation as an interlocking operation, outputs the operation signal corresponding thereto to the external device, and erases the operation input object A21g entirely to update the window image A2 as illustrated in FIG. 1B.

2. Configuration of Projector

Figure 2:
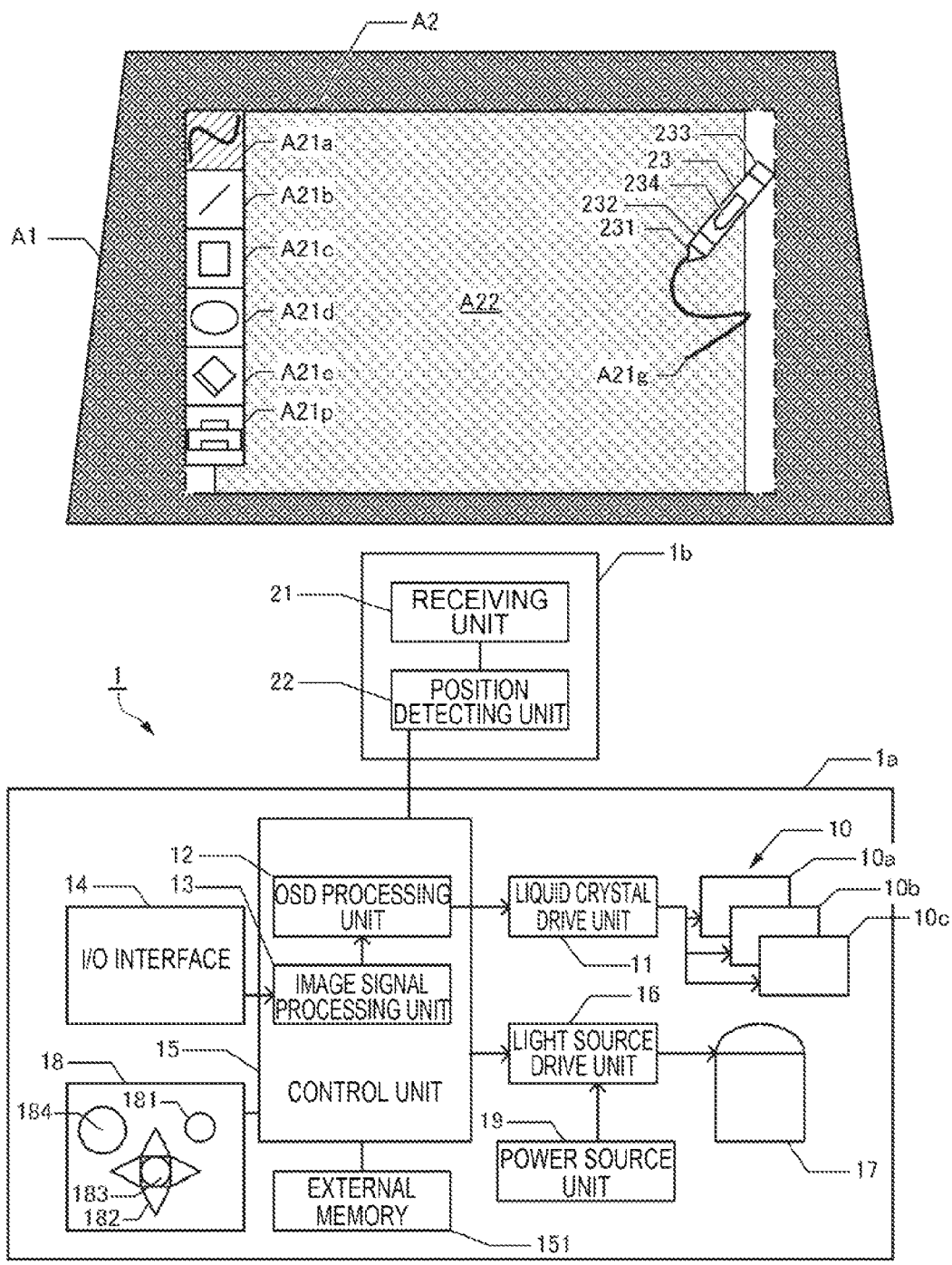
FIG. 2 is a block diagram of the first embodiment.

As illustrated in FIG. 2, the projector 1 includes a light source drive unit 16, a projection light source 17, a liquid-crystal light valve 10, a liquid-crystal drive unit 11 as a display unit, an I/O interface 14, a control unit 15, an external memory 151, an operating unit 18, and a power source unit 19 in a first housing 1a. The projector 1 includes a receiving unit 21 and a position detecting unit 22 configured to function as an image operation detection unit and an interlocking operation detection unit in a second housing 1b, which is connected to the first housing 1a. The projector 1 further includes an electronic pen 23.

The projection light source 17 is composed of a high-pressure mercury vapor lamp, an LED (Light-emitting diode), a laser, and the like, and is driven by the light source drive unit 16. The I/O interface 14 as an external device interface includes a plurality of I/O terminals (image input terminal) such as a USB terminal, an EATHENET (registered trademark) terminal, an HDMI (registered trademark) terminal, an RS232c terminal, configured to communicate with the external device, and receive inputs of various image signals from the external device, and output a device operation signal to the external device. The I/O interface 14 functions as an image input terminal portion configured to receive an input of the image signal from the external device. The control unit 15 controls respective parts of the projector 1 by executing control program stored in the external memory 151. The control unit 15 configured to function as a drawing unit, an output unit, and an interlocking editing unit includes an image signal processing unit 13 and an OSD processing unit 12, executes a drawing process on the basis of the image signal input from the external device and an operation position signal input from the position detecting unit 22, and outputs a projection signal as a display signal. The image signal processing unit 13 outputs image data of an external image layer and image data of an operation input layer to the OSD processing unit 12 as a result of drawing process on the basis of the image signal input from the external device and the operation position signal input from the position detecting unit 22. The OSD processing unit 12 outputs a projection signal corresponding to the liquid-crystal light valve 10 by combining the image data of the respective layers. The liquid-crystal drive unit 11 converts the projection signal output from the OSD processing unit 12 to an analogous signal for driving respective pixels of the liquid-crystal light valve 10. The liquid-crystal light valve 10 is provided with three liquid-crystal panels 10a, 10b, and 10c configured to control transmittances of light beams radiated from the projection light source 17 and having wavelengths of red, green, and blue separated by a dichroic mirror, not illustrated, respectively from one pixel to another. The operating unit 18 includes a menu bay 181 for inputting an instruction for projecting an OSD menu, a selection key 182 and a determination key 183 for selecting items of the OSD menu, and a power source switch 184 for turning power supply ON and OFF from an external power source to the power source unit 19. The power source unit 19 supplies electric power to the respective parts of the projector 1.

The electronic pen 23 includes a contact sensor 231, a light-emitting unit 232, a power source switch 233, and a side switch 234 in a pen-shape housing. The contact sensor 231 is provided at a distal end of the electronic pen 23 and detects a contact state and a non-contact state with respect to an object. The light-emitting unit 232 is provided in the vicinity of the distal end of the electronic pen 23, and radiates a light beam having an infrared ray wavelength during a period in which the contact sensor 231 detects the contact state with respect to the object. The power source switch 233 is a switch for controlling a power supply from a battery, not illustrated, to the contact sensor 231 and the light-emitting unit 232. The side switch 234 configured to function as a mode setting portion is a switch for switching from the drawing mode to the external device operating mode. During a period in which the contact sensor 231 detects the contact state with respect to the object in a state in which the side switch 234 is pressed, the electronic pen 23 operates so that the operation with respect to the projection surface using the electronic pen 23 is detected as the external device operation. Specifically, in the case where the contact sensor 231 detects the contact state with respect to the object with the side switch 234 in a pressed state, the wavelength of light beam emitted from the light-emitting unit 232 when the side switch 234 is pressed may be different from the wavelength of light beam emitted from the light-emitting unit 232 when the side switch 234 is not pressed.

In this case, two or more light sources having wavelengths different from, each other are required for the light-emitting unit 232. For example, in the state in which the side switch 24 is pressed, the number of light sources of the light-emitting unit 232 to be lit may be increased so that the image of the light-emitting unit 232 picked up by the receiving unit 21 is changed from the state in which the side switch 234 is not pressed.

In this case, two or more light sources having wavelengths the same as or different from each other are required for the light-emitting unit 232.

The receiving unit 21 is an infrared video camera configured to pick up an image of an entire projection area A1 of the projection surface, receives a light beam having an infrared ray wavelength, and outputs image data corresponding to the light beam having an infrared ray wavelength radiated from the electronic pen 23 during the period in which the distal end of the electronic pen 23 is in contact with the projection surface within the projection area A1. The position detecting unit 22 detects a light-emitting position of the light beam having an infrared ray wavelength, that is, the position of the electronic pen 23 by analyzing the image data output from the receiving unit 21, and outputs the operation position signal indicating the position of the electronic pen 23. The operation position signal is converted to a coordinate of the window image A2 by the control unit 15. The position detecting unit 22 determines whether or not the side switch 234 of the electronic pen 23 is pressed by analyzing the image data output from the receiving unit 21, and outputs a mode signal in accordance with a result of determination. When the side switch 234 is not pressed, the mode signal indicating the drawing mode is output, and when the side switch 234 is pressed, a mode signal indicating the external device operating mode is output. Therefore, the operation to bring the distal end of the electronic pen 23 into contact with the projection surface in the drawing mode is detected as the image operation, and the operation to bring the distal end of the electronic pen 23 into contact with the projection surface in the external device operating mode is detected as the external device operation.

3. Both-Direction Projecting Method
3-1. Drawing Layer and Drawing Area

Figure 3A:
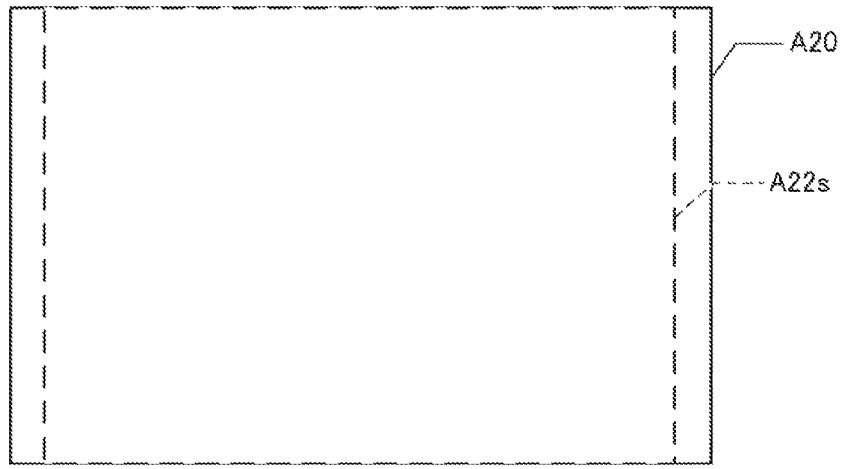
FIGS. 3A to 3C are drawings illustrating screen configuration of the first embodiment.
Figure 3B:
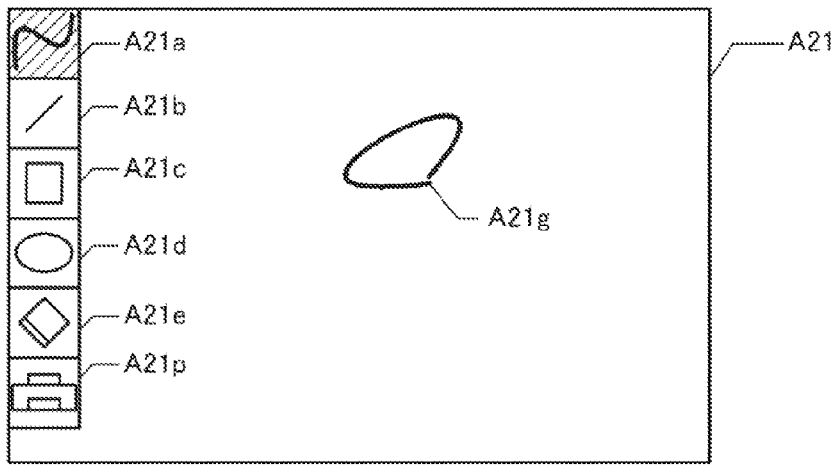
Figure 3C:
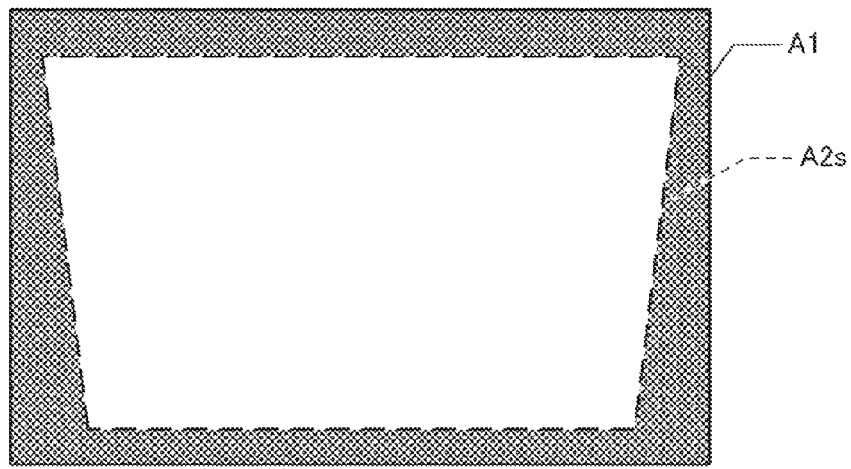

Referring now to FIGS. 3A to 3C, layers and area (drawing area) in which the control unit 15 draws the external image and the operation input object will be described.

An external image layer A20 illustrated in FIG. 3A and an operation input layer A21 illustrated in FIG. 3B are combined in a drawing area A2s within the projection area A1 illustrated in FIG. 3C. In this specification, the image in the drawing area A2s obtained by combining the external image layer A20 and the operation input layer A21 is referred to as a window image. The drawing area A2s of the window image with respect to the projection area A1 as a maximum possible projection area for the projector 1 is determined by a resolution (real resolution) and a trapezoidal distortion correction value of an effective area of the liquid-crystal light valve 10. When the trapezoidal distortion correction is performed, the drawing area A2s of the window image becomes a non-rectangular shape smaller than the projection area A1, which is the maximum possible projection area for the projector 1, as illustrated by a broken line in FIG. 3C. The correction value of the trapezoidal distortion may be set automatically on the basis of a result of detection of a projecting state, or may be set by a user by using the OSD menu. The image signal processing unit 13 of the control unit 15 draws the external image layer A20 and the operation input layer A21 illustrated in FIG. 3A separately, and the OSD processing unit 12 superimposes the two layers in the drawing area A2s to output a projection signal for projecting the window image A2.

On the external image layer A20, an external image is drawn on the basis of the image signal input from the I/O interface 14, that is, on the basis of the image signal output from the external device. When an aspect ratio of the external image and an aspect ratio of the window image A2 are different from each other, the control unit 15 sets a drawing area A22s of the external image so that the external image does not protrude from the drawing area of the window image A2 and two sides of the external image are overlapped with two sides of the window image A2. If a resolution of the external image indicated by the input image signal does not match a resolution of the set drawing area, the external image is enlarged or contracted.

The operation input layer A21 is drawn on the front side with respect to the external image layer A20 in the drawing area A2s. On the operation input layer A21, the image signal processing unit 13 draws icons A21a, A21b, A21c, A21d, A21e, and A21p and an operation input object A21g with respect to the operation position signal input from the position detecting unit 22. The icons A21a, A21b, A21c, A21d, and A21e indicate areas for allowing the user to select a graphic to be used for an operation of drawing on the operation input layer A21 with the electronic pen 23 with respect to the operation area on the projection surface.

3-2. Drawing Mode

When an operation position signal indicating an area where the icons A22a, A21b, A22c, A21d, and A22e are drawn and a mode signal indicating the drawing mode are input from the position detecting unit 22, the control unit 15 prepares a drawing process corresponding to the respective areas.

When the distal end of the electronic pen 23 comes into contact with an area where the icon A21a is projected, the image signal processing unit 13 draws a contact trajectory of the distal end of the electronic pen 23 with respect to the subsequent projection surface on the operation input layer A21 as the operation input object A21g. When the distal end of the electronic pen 23 comes into contact with an area in which the icon A21b is projected, the image signal processing unit 13 changes the thickness of a line to be drawn on the operation input layer A21. When the distal end of the electronic pen 23 comes into contact with an area where the icon A21c is projected, the image signal processing unit 13 draws a rectangular shape having a starting point and an end point of a contact trajectory of the distal end of the electronic pen 23 with respect to the subsequent projecting surface at both ends of a diagonal line in the operation input layer A21. When the distal end of the electronic pen 23 comes into contact with an area where the icon A21d is projected, the image signal processing unit 13 draws an oval inscribing the rectangular shape having a starting point and an end point of a contact trajectory of the distal end of the electronic pen 23 with respect to the subsequent projecting surface at both ends of a diagonal line in the operation input layer A21, When the distal end of the electronic pen 23 comes into contact with an area where the icon A21e is projected, the image signal processing unit 13 erases the operation input object A21g corresponding to the operation with respect to the projection surface using the electronic pen 23 in the past on the contact trajectory of the distal end of the electronic pen 23 with respect to the projection surface from then onward. During a period in which the drawing process corresponding to the icons A21a, A21b, A21e, A21d, and A21e is prepared or performed, the image signal processing unit 13 performs drawing for emphasizing the corresponding icons A21a, A21b, A21c, A21d, and A21e. The icon A21p indicates an area for bringing the distal end of the electronic pen 23 to come into contact with the projection surface for an input of a printing instruction.

3-3. External Device Operating Mode

Figure 4:
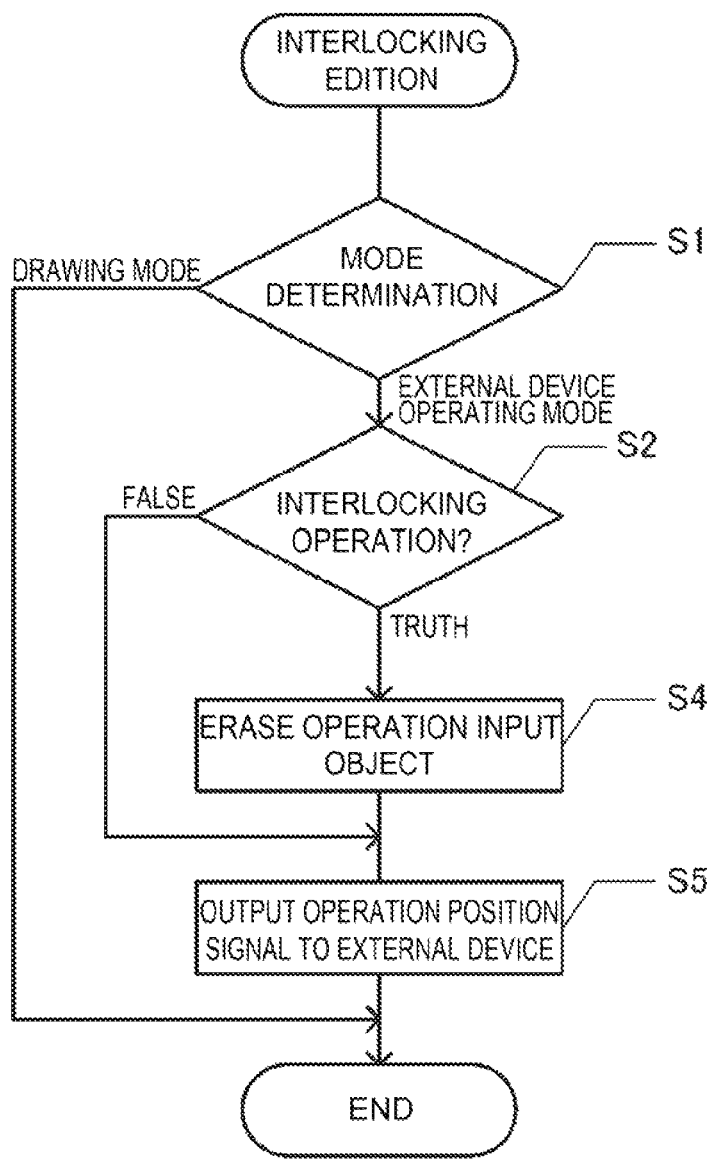
FIG. 4 is a flowchart of the first embodiment.

Subsequently, an interlocking edition process of the projector 1 in the external device operating mode will be described with reference to FIG. 4, When the operation position signal and the mode signal are input from the position detecting unit 22, the control unit 15 determines the mode on the basis of the mode signal (Step S1). If the mode is determined to be the external device operating mode, the mode is transferred to the external device operating mode. In other words, whether the device operation is to be detected or the image operation is to be detected from the operation signal is determined, in accordance with the mode signal.

When the mode is transferred to the external device operating mode, the control unit 15 determines whether or not the detected device operation is the interlocking operation on the basis of the operation position signal (Step S2). The interlocking operation is an operation with respect to the external device such as PC, and is also an operation for the operation input object A21g. In this example, left click with respect to the PC is defined as the interlocking operation. An OS (Operating System) of the PC recognizes the left click when an operation position signal corresponding to an operation of bringing the distal end of the electronic pen 23 into contact with the projection surface in a state of pressing the side switch 234 of the electronic pen 23 and bringing out of contact with the projection surface without moving the distal end of the electronic pen 23 on the projection surface is input. In other words, in the case where the operation position signal and the mode signal corresponding to the left click as described above are input, the control unit 15 determines the operation to be the interlocking operation.

Figure 5A:
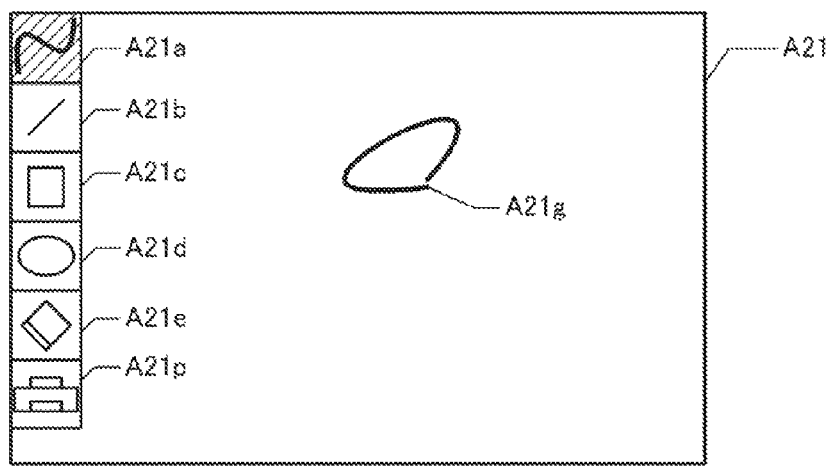
FIGS. 5A and 5B are drawings illustrating screen configuration of the first embodiment.
Figure 5B:
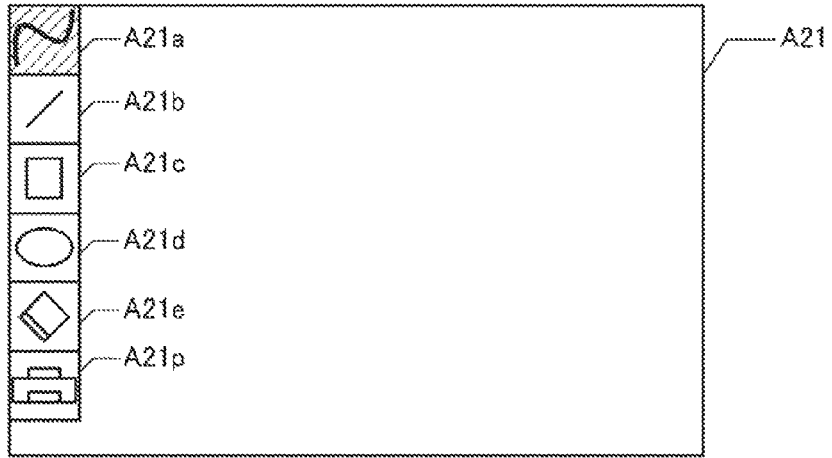

When it is determined to be the interlocking operation, the control unit 15 erases all the operation input object (Step S4). In other words, the control unit 15 erases all the operation input object A21g drawn before the interlocking operation as illustrated in FIGS. 5A and 5B. Consequently, the window image A2 displayed on the projection surface by the projector 1 is changed as illustrated in FIGS. 1A and 1B, and the operation input object A21g disappears from the screen.

Here, as a method of erasing only the operation input object from the operation input layer, identifiers indicating the operation input object or the icon is assigned to respective pixels of the operation input layer, and all the pixels assigned to the identifiers indicating the operation input object are reset to an initial value. The initial value here means a pixel value which is used in weighted summing to 100% for pixels on the external image layer on the back side, and in weighted summing to 0% for pixels on the operation input layer when superimposing the layers. Alternatively, a method of separating the operation input layer for drawing the operation input object and for drawing the icons A21a, A21b, A21c, A21d, A21e, and A21p, or a method of drawing each of the operation input object and the icons on different layers respectively and resetting the entire layer for drawing the operation input object to the initial value may also be employed.

Subsequently, the control unit 15 outputs the operation position signal to the external device as the device operation signal (Step S5). Therefore, in the external device operating mode, the external device recognizes device operations such as left click, right click, double click, drag and drop on the basis of the operation position signal, and performs a process in accordance with the recognized device operations.

Here, an advantage of this example will be described in detail supposing a circumstance in which an application program for the presentation in the PC as the external device is executed, and the left click is recognized as an operation for slide change (a process of switching the current slide to the nest slide) in this application program. As described already, the operation which is recognized as the left click in the PC is detected as the interlocking operation by the projector 1 in this example. The operation position signal corresponding to the interlocking operation is output to the PC. Therefore, when the projector 1 detects the interlocking operation, the OS of the PC recognizes the left click, and the application program recognizes the operation of the slide change. The application program of the PC, upon recognition of the operation of the slide change, draws data on the next slide as an image for displaying the next slide. Consequently, an image signal corresponding to the image in which the next slide is drawn is input to the projector 1, and hence an external input image displayed on the projection surface shows the next slide. If the operation input object is displayed as a comment for the previous slide displayed by the external input image, the comment does not correspond to the next slide. According to this example, if an operation to change the external input image so as to display the previous slide to the next slide is performed, the operation input object corresponding to the previous slide is entirely erased. Therefore, additional operation for erasing the operation input object which does not correspond to the next slide any longer does not to be performed. In other words, according to this example, an operation for editing the operation input object which does not correspond to the external image any longer is not necessary.

In addition, according to this example, a series of operations such that the distal end of the electronic pen 23 is brought into contact with the projection surface in a state in which the side switch 234 of the electronic pen 23 is pressed, and the distal end of the electronic pen 23 is brought out of contact with the projection surface without moving on the projection surface are detected as the image operation for drawing dots in the drawing mode, and is detected as the interlocking operation by the projector 1 and detected by the PC as the left click in the device operation mode. Therefore, the number of types of operation may be reduced. Therefore, the projector 1 having a simple user interface and easy to operate is achieved.

4. Other Embodiments

A technical scope of the invention is not limited to the above-described example, and various modifications may be made without departing the scope of the invention as a matter of course.

For example, defining a state in which the side switch 234 is not pressed as the external device operating mode, and the state in which the side switch 234 is pressed as the drawing mode, the device operations determined in advance such as the left click detected by the external device operating mode may be detected as the interlocking device operation.

For example, a switching operation between the drawing mode and the external device operating mode may be detected by using the operating unit 18, and the operations not for the screen may be detected as the device operation. Specifically, the operation of pressing the selection key 182 and the determination key 183 of the operating unit 18 may be detected as the device operation and the interlocking operation. Alternatively, an operation of pressing a switch of a device provided with a function for radio-transmitting the device operation signal to the projector (for example, a device such as a laser pointer) may be detected as the device operation and the interlocking operation.

Figure 6A:
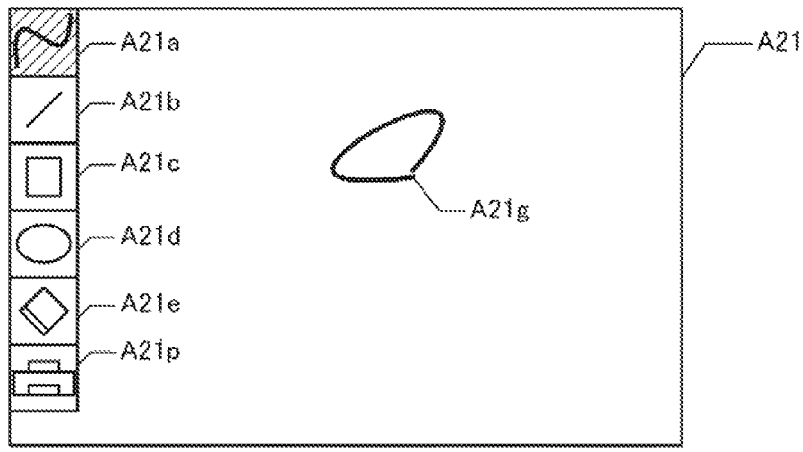
FIGS. 6A to 6B are drawings illustrating screen configuration of the first embodiment.
Figure 6B:
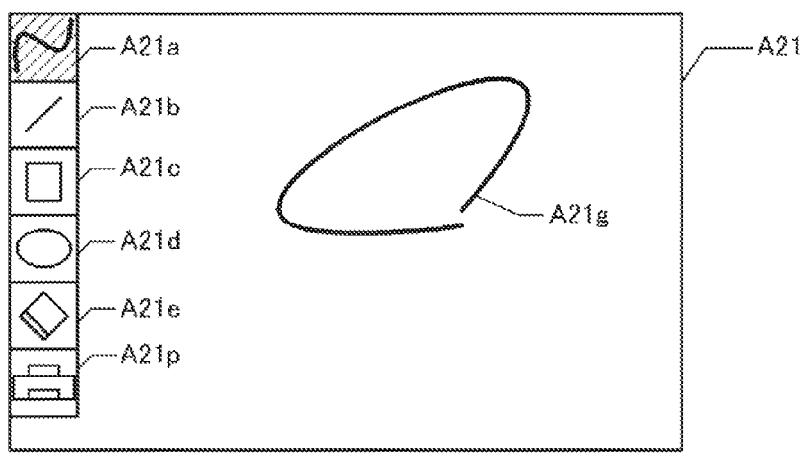

Also, for example, the window image may be updated by enlarging or contracting the operation input object in accordance with the operation of enlarging or contracting part of the screen. For example, as illustrated in FIG. 6A, it is assumed that pinching operation is performed in a state in which the window image obtained by combining the operation input layer A21 on which the operation input object A21g is drawn and the external image is projected, and the projector which detects the pinching operation outputs a device operation signal corresponding to the pinching operation to the PC. In this case, if the PC performs the drawing process of enlarging or contracting part of the image indicating the screen, the object indicated by the image signal input from the PC to the projector is enlarged or contracted, and the external image is changed. In this case, if the operation input object is not changed, the operation input object does not correspond to the external image. Therefore, in the projector, the pinching operation is detected as the interlocking operation in the projector, and the operation input object A21g enlarged as illustrated in FIG. 6B in accordance with the detected pinching operation may be re-drawn in the operation input layer A21 or the contracted operation input object A21g may be re-drawn in the operation input layer A21. In order to detect the pinching operation to pinch the projection surface with two fingers and spread them apart or bring them together as the device operation and the interlocking operation, an infrared laser curtain or the like for detecting a contact state of the fingers and the projection surface is required. By detecting the light beam having an infrared ray wavelength radiated from the laser curtain and reflected by the finger, the contact state and the non-contact state of the fingers with respect to the projection surface may be detected.

Figure 6C:
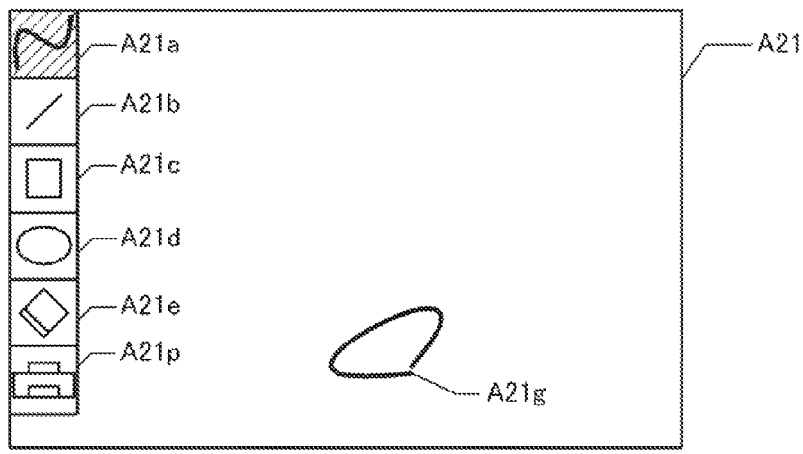
Figure 7:
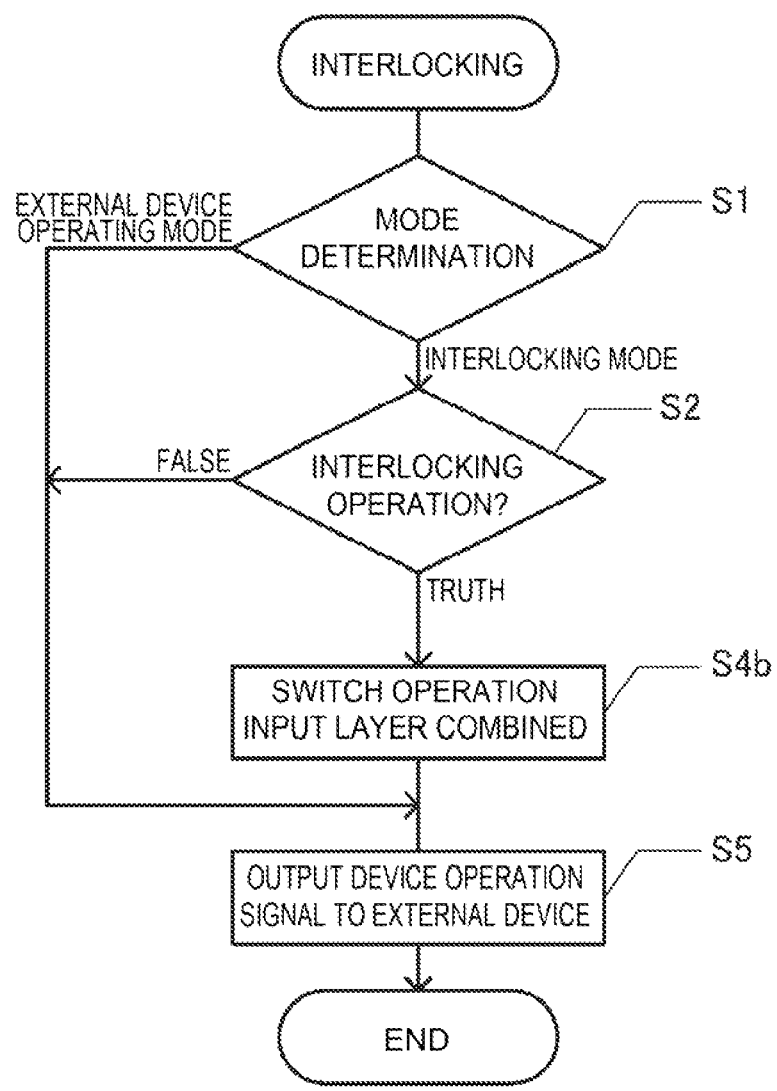
FIG. 7 is a flowchart of the first embodiment.

Also, for example, the window image may be updated so that the operation input object moves in accordance with the operation of scrolling the screen. It is assumed that a device operation signal corresponding to an angle of rotation of a wheel of the device provided with the function of radio-transmitting the device operation signal to the projector (for example, the device such as a laser pointer) is output from the projector to the PC. In this case, if the PC performs the drawing process of moving the object within the screen of the PC, the object indicated by the image signal input from the PC to the projector moves, and the external image is changed. In this case, if the operation input object is not moved, the operation input object does not correspond to the external image. Therefore, in the projector, the operation of rotating the wheel is detected as the interlocking operation, and the operation input object A21g moved as illustrated in FIGS. 6A to 6C in accordance with the angle of rotation of the detected wheel may be re-drawn in the operation input layer A21.

Figure 8A:
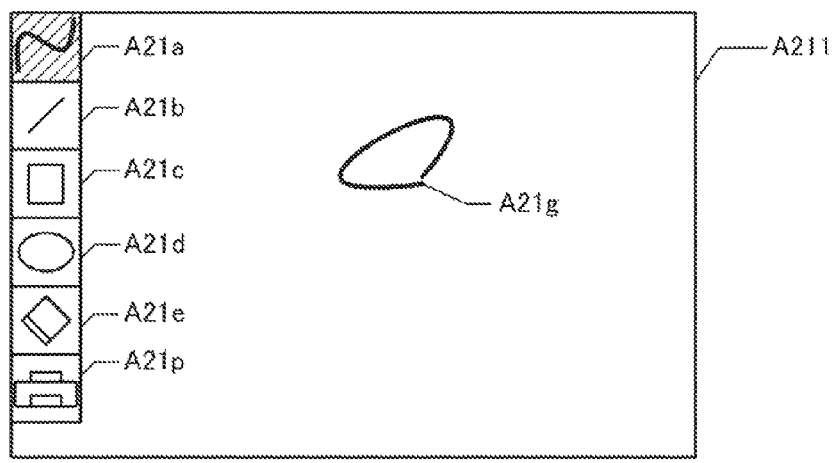
FIGS. 8A and 8B are drawings illustrating screen configuration of the first embodiment.
Figure 8B:
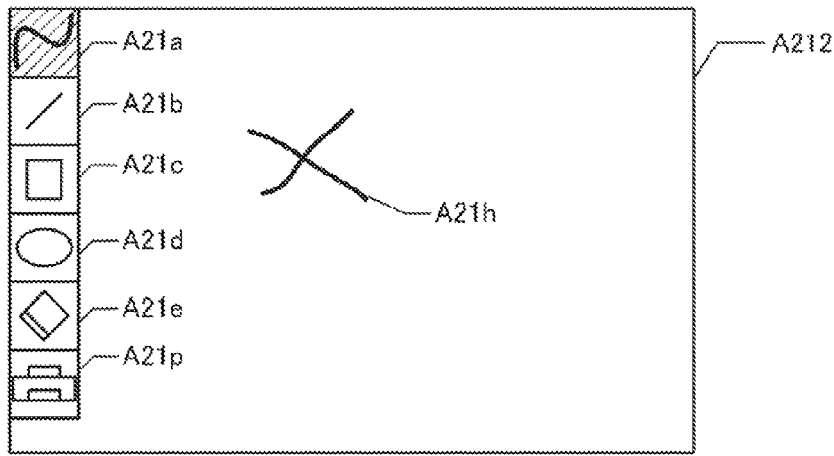

Alternatively, for example, the window image may be updated without editing the operation input layer. For example, storage areas for an operation input layer A211 for drawing the operation input object A22g illustrated in FIG. 8A corresponding to a first slide A drawn by the PC and an operation input layer A212 for drawing an operation input object A21h illustrated in FIG. 8B corresponding to a second slide B drawn by the PC are prepared separately. The device operation for switching the slide is detected as the interlocking operation, and every time when the interlocking operation is detected, the operation input layer to be combined with the external image is switched. Accordingly, the operation input object corresponding to the slide is displayed in accordance with the switching of the slides. In this manner, with the configuration in which the projector is capable of memorize two or more operation input layers, the operation input object in accordance with the change of the external image may be displayed without editing the operation input layer.

For example, in order to project an image, light may be modulated by using one liquid crystal panel, light may be modulated by using a reflecting-type liquid crystal panel, or light may be modulated by using a DMD (Digital Mirror Device). For example, a convex mirror may or may not be used for projecting the projection image in an enlarged scale. For example, the invention may be applied to a display device such as a touch panel display and the like.

Second Embodiment

Figure 9:
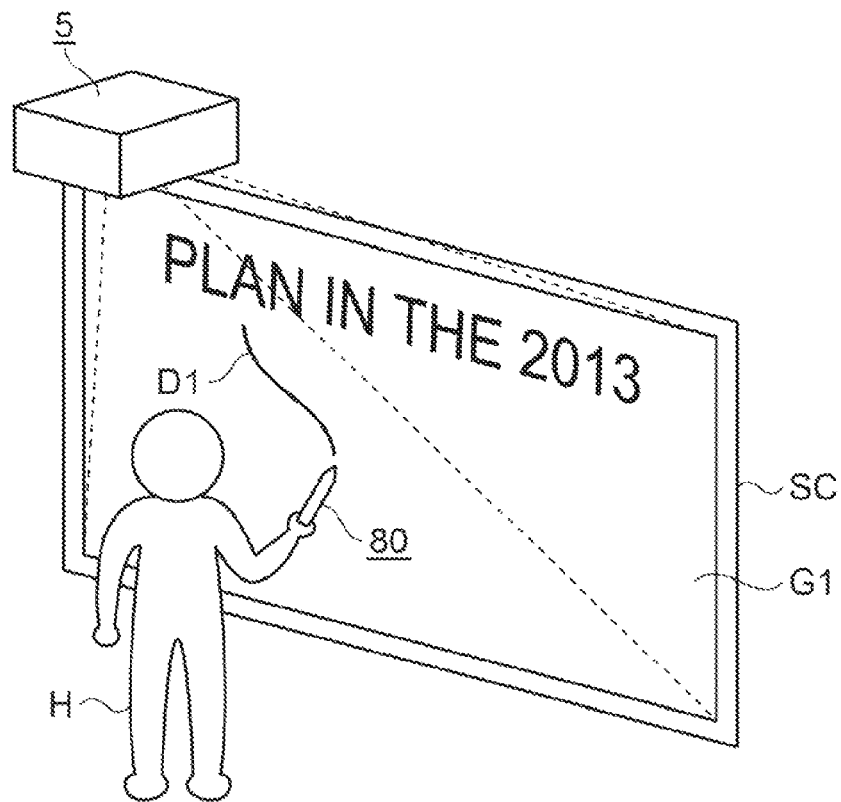
FIG. 9 is an explanatory drawing illustrating a state of usage of a projector of a second embodiment.

FIG. 9 is an explanatory drawing illustrating a state of usage of a projector 5 of a second embodiment.

As illustrated in FIG. 9, the projector 5 as one embodiment of the both-direction display apparatus is installed above a user H so as to be hung from the ceiling, and the user H performs an image operation (which corresponds to the image operation in the first embodiment) by using an electronic pen 80 on a projection surface SC (which corresponds to the screen in the first embodiment) on which the projector 5 projects the image. The projector 5 detects operation information such as a position pointed by the electronic pen 80 by a pen operation detection device 65 (see FIG. 11), described later. Then, the projector 5 combines a drawing data D1 on the basis of the drawing operation of the electronic pen 80 with an image data G1, and projects the composite image on the projection surface SC.

The drawing data D1 (including drawing data D2 described later) corresponds to the operation input object of the first embodiment. The image data G1 (including image data D2 described later) corresponds to the external image of the first embodiment. Hereinafter, these data will be referred to simply as drawing data and image data. In the following explanation, an operation to combine the drawing data with the image data is appropriately used as "superimposed".

Figure 10:
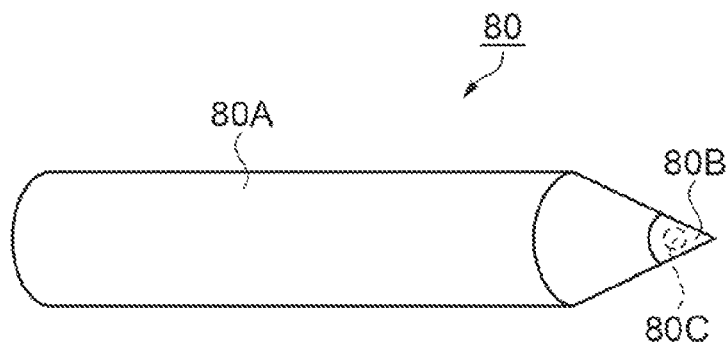
FIG. 10 is a drawing illustrating an appearance of an electronic pen of the second embodiment.

FIG. 10 is an appearance drawing of the electronic pen 80.

As illustrated in FIG. 10, the electronic pen 80 has a housing 80A of a pen type having a pointed distal end, and includes a pen-tip switch 80B and a light-emitting portion 80C configured to emit an infrared ray at the distal end of the housing 80A. The pen operation detection device 65 of the projector 5, descried later, picks up an image of the infrared ray, and detects an operating position of the electronic pen 80. The electronic pen 80 in this embodiment has substantially the same configuration as the electronic pen 23 in the first embodiment.

Figure 11:
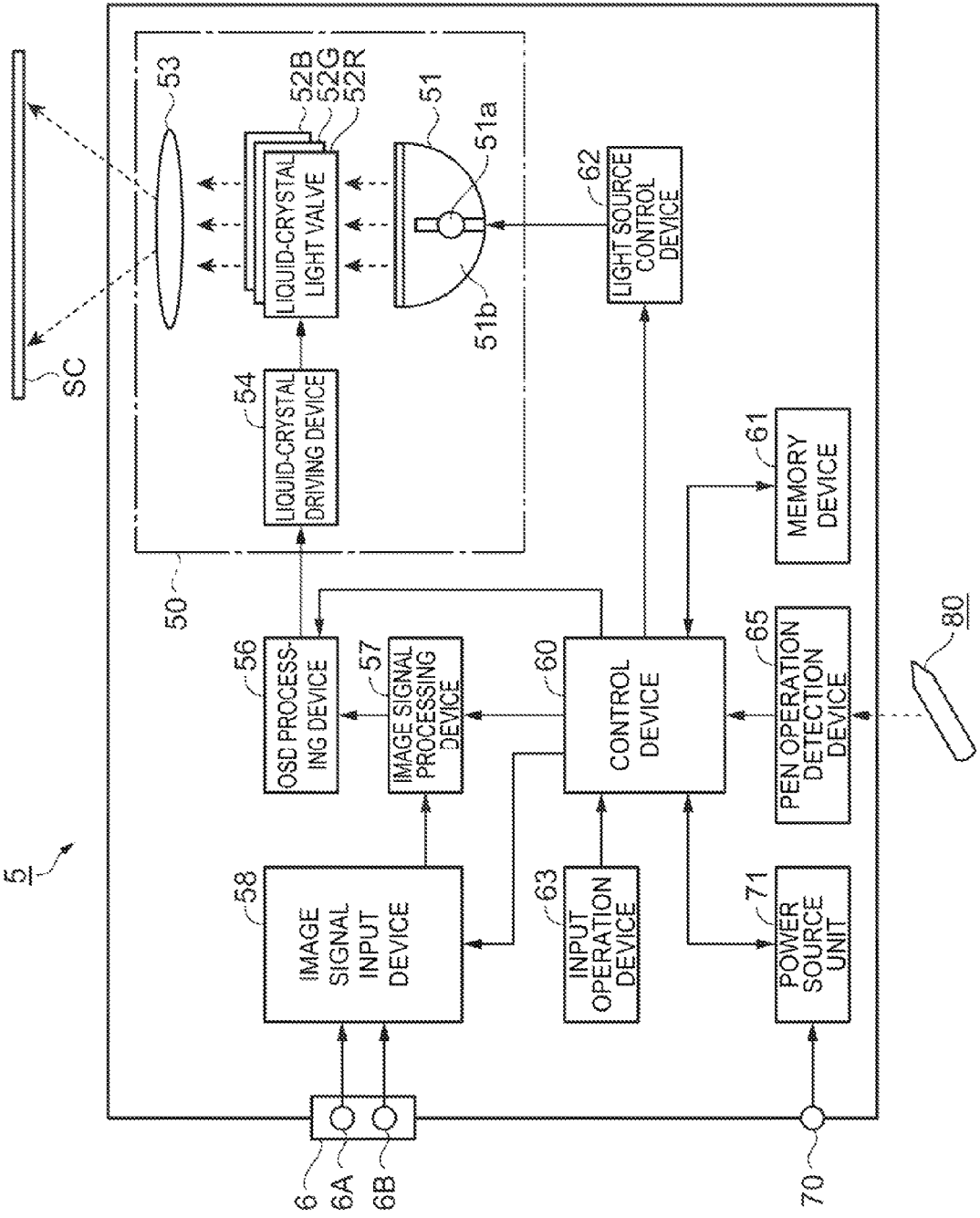
FIG. 11 is a block diagram illustrating a circuit configuration of the projector of the second embodiment.

FIG. 11 is a block diagram illustrating a circuit configuration of the projector 5 according to the second embodiment.

As illustrated in FIG. 11, the projector 5 includes an image input terminal portion 6 (image input terminals 6A and 6B), an image projecting device 50, an OSD processing device 56, an image signal processing device 57, an image signal input device 58, a control device 60, a memory device 61, a light source control device 62, an input operation device 63, the pen operation detection device 65, a power source terminal 70, and a power source unit 71, and these members are housed in the interior or on an outer surface of a housing of the projector 5, not illustrated.

The image projecting device 50 includes a light source 51, three liquid-crystal light valves 52R, 52G, 52B as a light-modulating unit, a projection lens 53 as a projection optical system, and a liquid-crystal driving device 54. The image projecting device 50 displays an image on the projection surface SC or the like by modulating a light beam emitted from the light source 51 by the liquid-crystal light valves 52R, 52G, 52B, and projecting the modulated, light beam from the projection lens 53. The image projecting device 50 corresponds to the display unit in the first embodiment when the light source control device 62 is included.

The light source 51 (which corresponds to the projection light source 17 in the first embodiment) includes a discharging-type light source lamp 51a composed of an extra high pressure mercury lamp, a metal halide lamp, or the like and a reflector 51b configured to reflect the light beam radiated from the light source lamp 51a toward the liquid-crystal light valves 52R, 52G, 52S.

The light beam emitted from the light source 51 is converted into a light beam having a substantially uniform luminance distribution by an integrator optical system, not illustrated, is split into respective color light components of red (R), green (G), and blue (B), which are three primary colors of light, by a color separator optical system, not illustrated, and the respective light components enter the liquid-crystal light valves 52R, 52G, and 52B respectively.

The liquid-crystal light valves 52R, 52G, and 52B are composed of a liquid crystal panel or the like having liquid crystal encapsulated between a pair of transparent substrates. The liquid-crystal light valves 52R, 52G, and 52B each include a plurality of pixels (not illustrated) arrayed in a matrix form, and a drive voltage can be applied to the liquid crystal from one pixel to another. The liquid-crystal light valves 52R, 52G, and 52B correspond to the liquid-crystal panels 10a, 10b, and 10c which constitute the liquid-crystal light valve 10 of the first embodiment.

When the liquid-crystal driving device 54 (which corresponds to the liquid-crystal drive unit 11 of the first embodiment) applies the drive voltage in accordance with image information input thereto to the respective pixels, the respective pixels are set to have light transmittances in accordance with the image information. Therefore, the light beam emitted from the light source 51 is modulated by passing through the liquid-crystal light valves 52R, 52G, and 52B, and image light in accordance with the image information is formed for each color light.

The image light beams of the respective colors are formed into color image light beams by being combined from one pixel to another by the color combining optical system, not illustrated, and then the combined image light beam is projected, on the projection surface SC by the projection lens 53 in an enlarged pattern.

In the embodiment, the projector 5 configured to project by using the light source lamp 51a as the light source 51 has been described. However, the invention may be applied to a projector configured to project by using an LED (light emitting diode) light source or a laser light source as the light source.

In the embodiment, a projection optical system of a transmitting-type liquid crystal system employing the three liquid-crystal light valves 52R, 52G, and 52B is exemplified as the image projecting device 50. However, light-modulating units of other display system such as a reflecting-type liquid crystal display system or a micro-mirror device system (light switch display system) may be employed.

The image signal input device 58 receives inputs of image information from an external image output device such as a video reproduction apparatus or a personal computer via a cable or a communication device, not illustrated, from a plurality of image input terminals (image input terminals 6A and 6B in the embodiment) which constitute the image input terminal portion 6. The image signal input device 58 corresponds to the I/O interface 14 of the first embodiment including the image input terminal portion 6.

The input image information is output to the image signal processing device 57 on the basis of an instruction from the control device 60. The image signal input device 58 may have a configuration including a receiving unit such as a radio communication or an optical communication, and receiving an input of the image signal by radio from the external device.

The image signal processing device 57 (which corresponds to the image signal processing unit 13 of the first embodiment) converts the image information input from the image signal input device 58 into image information indicating tones of the respective pixels of the liquid-crystal light valves 52R, 52G, and 52B on the basis of an instruction from the control device 60. The converted image information includes items for the respective color lights of red (R), green (G), and blue (B), and includes a plurality of pixel values corresponding to all the pixels of the respective liquid-crystal light valves 52R, 52G, and 52B. The pixel value determines light transmittance of the corresponding pixel, and the pixel value determines light intensity (tone) of the light beam passing and going out through the pixel.

The OSD processing device 56 (which corresponds to the OSD processing unit 12 of the first embodiment) performs a process for superimposing and displaying the OSD (On Screen Display) image such as a menu image and a message image on the projection image on the basis of an instruction from the control device 60. The OSD processing device 56 is provided with an OSD memory, which is not illustrated, and memorizes OSD image information which indicates graphics or fonts for forming the OSD image. As the menu image of the embodiment, icons A21a to A21e, and A21p of the first embodiment are included.

When the control device 60 instructs a superimposed display of the OSD image, the OSD processing device 56 reads out the required OSD image information from the OSD memory, and combines the OSD image information to the image information input from the image signal processing device 57 so that the OSD image is superimposed onto the projection image at a predetermined position. The image information having the OSD image information combined thereto is output to the liquid-crystal driving device 54.

When there is no instruction of superimposition of the OSD image from the control device 60, the OSD processing device 56 outputs the image information input from the image signal processing device 57 to the liquid-crystal driving device 54 as if is.

When the liquid-crystal driving device 54 drives the liquid-crystal light valves 52R, 52G, and 52B in accordance with the image information input from the OSD processing device 56, the liquid-crystal light valves 52R, 52G, and 52B form an image in accordance with the image information, and the image is projected from the projection lens 53.

The control device 60 includes a CPU (Central Processing Unit) and an RAM (Random Access Memory) used for a temporal memorization of various data, and controls the operation of the projector 5 in a lump by operating in accordance with the control pro-gram (not illustrated) memorized in the memory device 61. In other words, the control device 60 functions as a computer together with the memory device 61. The control device 60 controls the projector to switch between a drawing state in which the drawing data of the electronic pen 80 is projected so as to be superimposed onto the image data, and a non-drawing state in which only the image data is projected. The control device 60 functions as the drawing unit, the output unit, and the interlocking editing unit in the same manner as the control unit 15 of the first embodiment when the image signal processing device 57 and the OSD processing device 56 are included. The control device 60 (including the image signal processing device 57 and the OSD processing device 56) execute the drawing process on the basis of the image data (image signal) input from the external device and the pen operation information input from the pen operation detection device 65 described later (operating position (coordinate) and the pen operating state such as the press-down state).

The memory device 61 (which corresponds to the external memory 151 of the first embodiment) includes a rewritable non-volatile memory such as a flash memory or an FeRAM, and includes a control program for controlling the operation of the projector 5 and various setting data that determines operating conditions of the projector 5 memorized therein. The memory device 61 memorizes the drawing data by the electronic pen 80 (D1 and D2 illustrated in FIGS. 12A and 12C or the like).

The light source control device 62 (which corresponds to the light source drive unit 16 of the first embodiment) controls the supply and the stop of the power with respect to the light source 51 on the basis of the instruction from the control device 60, and switches ON and OFF of the light source 51.

The input operation device 63 (which corresponds to the operating unit 18 of the first embodiment) includes a plurality of operation keys used by the user H for issuing various instructions for the projector 5, which are composed of main body keys provided on an outer surface of the housing (not illustrated) of the projector 5.

The operation keys provided on the input operation device 63 include a power key for switching ON and OFF of the power source alternately, an input switching key for switching a plurality of the image input terminals 6A and 6B, a menu key for displaying the set menu or the like in a superimposed manner, a direction key (four operation keys corresponding to up, down, left, and right) used for selecting items in the set menu, or the like, a determination key for settling the selected item, and a cancel key for canceling the operation.

In the embodiment, the operation of the input switching key corresponds to a display switching operation, and performs an operation of switching the state between the drawing state and the non-drawing state for the image input terminals 6A and 6B being selected. Specifically, the input switching key switches the state among the drawing state and the non-drawing state of a certain image input terminal, and the drawing state and the non-drawing state of the next image input terminal in this order. The display of the display switching operation will be described in FIGS. 12A to 12B described later. The display switching operation corresponds to the interlocking operation of the first embodiment.

When the respective operation keys of the input operation device 63 are operated, the input operation device 63 outputs the operation signal in accordance with contents of operation performed by the user H to the control device 60. The input operation device 63 may be configured to have a remote controller signal receiving device (not illustrated) and a remote controller (not illustrated) capable of remote operation. In this case, the remote controller emits an operation signal such as an infrared ray in accordance with the contents of the operation performed by the user H, and the remote control signal receiving device receives and transmits the emitted operation signal to the control device 60' as control information.

The pen operation detection device 65 is composed of an image-pickup element, not illustrated, or the like, and detects the pen operating state such as the operation position (coordinate) of the electronic pen 80 and the pressed-down state of the pen-tip switch 80B (see FIG. 10) on the basis of an instruction from the control device 60, and notifies the control device 60 of the detected pen operation information. The pen operation detection device 65 corresponds to the receiving unit 21 and the position detecting unit 22 of the first embodiment.

Power of AC100V or the like is supplied to the power source unit 71 (which corresponds to the power source unit 19 of the first embodiment) from the outside via the power source terminal 70, The power source unit 71, for example, converts a commercial power (AC power) to a DC power having a predetermined voltage, and provides the converted power to the respective parts of the projector 5. The power source unit 71 is capable of switching the state between the state in which power (operating power) required for projecting images is supplied to respective portions (power ON state) and a state in which a supply of operating power is stopped and an operation for turning the power ON is waited for (standby state) on the basis of an instruction from the control device 60.

Subsequently, an example of transition of the projected image at the time of display switching operation of the projector 5 of the embodiment will be described with a screen, transfer drawing in FIGS. 12A to 12D.

Figure 12A:
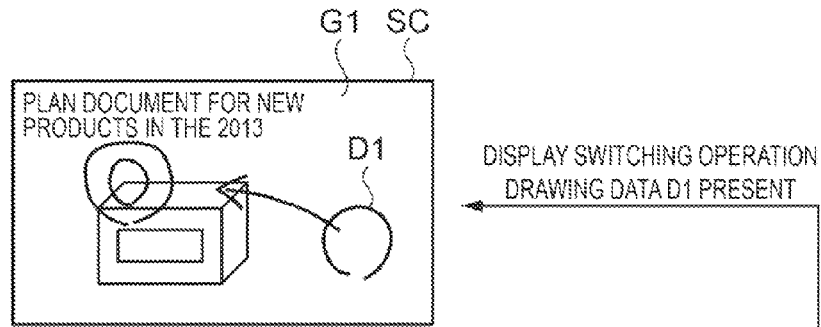
FIGS. 12A to 12D are drawings illustrating a screen transition at the time of switching a display of the projector of the second embodiment.
Figure 12B:
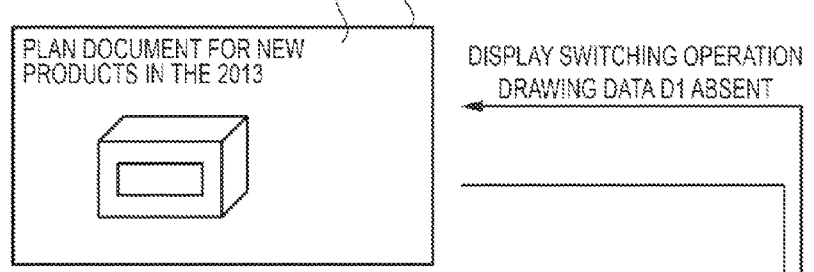
Figure 12C:
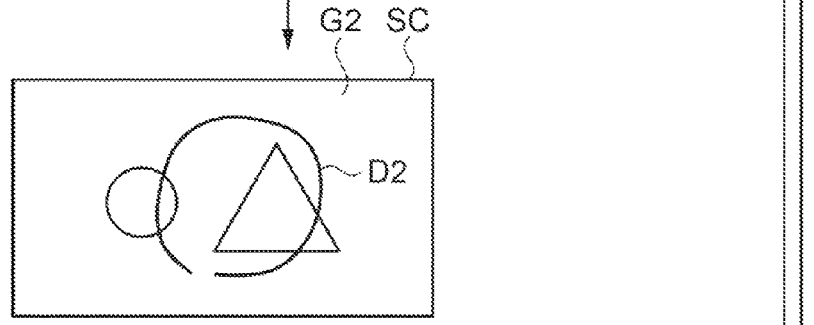
Figure 12D:
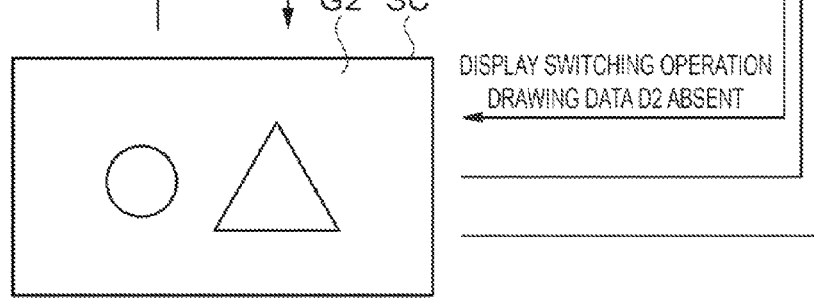

In FIGS. 12A to 12D, the projector 5 has inputs of image data G1 and G2 respectively to two image input terminals 6A and 68 (see FIG. 11). FIGS. 12A and 12C are drawings illustrating display (projection) examples in the drawing state, and FIGS. 12B and 12D are drawings illustrating display examples in the non-drawing state. Also, FIGS. 22A and 12B illustrate the state in which the image data G1 input to the image input terminal 6A is displayed as an image, and FIGS. 12C and 12D illustrate the state in which the image data G2 input to the image input terminal 6B is displayed as an image.

In the following description, the expression "the data is displayed (projected) as an image on the projection surface" is abbreviated to "the data is displayed (projected)".

As illustrated in FIG. 12A, the projector 5 is in the drawing state, and the drawing data D1 input by the electronic pen 80 is superimposed onto the image data G1 and is projected on the projection surface SC. If the display switching operation is performed in this state, the state is transferred to the non-drawing state illustrated in FIG. 12B.

As illustrated in FIG. 12B, the drawing data D1 is erased from the display in the drawing state illustrated in FIG. 12A, and only the image data G1 is projected on the projection surface SC. This state is the non-drawing state. The drawing data D1 is erased from the screen, but is saved in the memory device 61 (see FIG. 11), and is displayed when the state is switched to the drawing state again. If the display switching operation is performed in the state illustrated in FIG. 12B, the input is switched to the image input terminal 6B. Subsequently, if the drawing data D2 corresponding to the image input terminal 6B is saved in the memory device 61, the state is transferred to the drawing state illustrated in FIG. 22C, and if the drawing data D2 is not saved, the state is transferred to the non-drawing state illustrated in FIG. 12D. When the drawing operation by the electronic pen 80 is accepted in the non-drawing state illustrated in FIG. 12B, the state is transferred to the drawing state illustrated in FIG. 12A.

As illustrated in FIG. 12C, the projector 5 is transferred to the drawing state, and the drawing data D2 corresponding to the drawing data G2 is superimposed and is projected on the projection surface SC. If the display switching operation is performed in the state illustrated in FIG. 12C, the state is transferred to the non-drawing state illustrated in FIG. 12D.

As illustrated in FIG. 120, the drawing data D2 is erased from the display in the drawing state in FIG. 12C, and the state is transferred, to a state in which only the image data G2 is projected on the projection surface SC. The drawing data D2 is erased from the screen, but is saved in the memory device 61 (see FIG. 11), and is displayed when the state is switched to the drawing state again. If the display switching operation is performed in the state of FIG. 12D, the input is switched to the image input terminal 6A. Subsequently, if the drawing data D1 corresponding to the image input terminal 6A is saved in the memory device 61, the state is transferred to the drawing state illustrated in FIG. 12A, and if the drawing data D1 is not saved, the state is transferred to the non-drawing state in FIG. 12E. When the drawing operation by the electronic pen 80 is accepted in the non-drawing state illustrated in FIG. 12D, the state is transferred to the drawing state illustrated in FIG. 12C.

In FIGS. 12A to 12D, although the image data G1 and G2 of the two image input terminals 6A and 6B are used for description, the same transfer is performed in the case where three or more image input terminals are provided.

Subsequently, the operation of the projector 5 in the embodiment will be described with reference to a flowchart in FIGS. 13A and 13B.

Figure 13A:
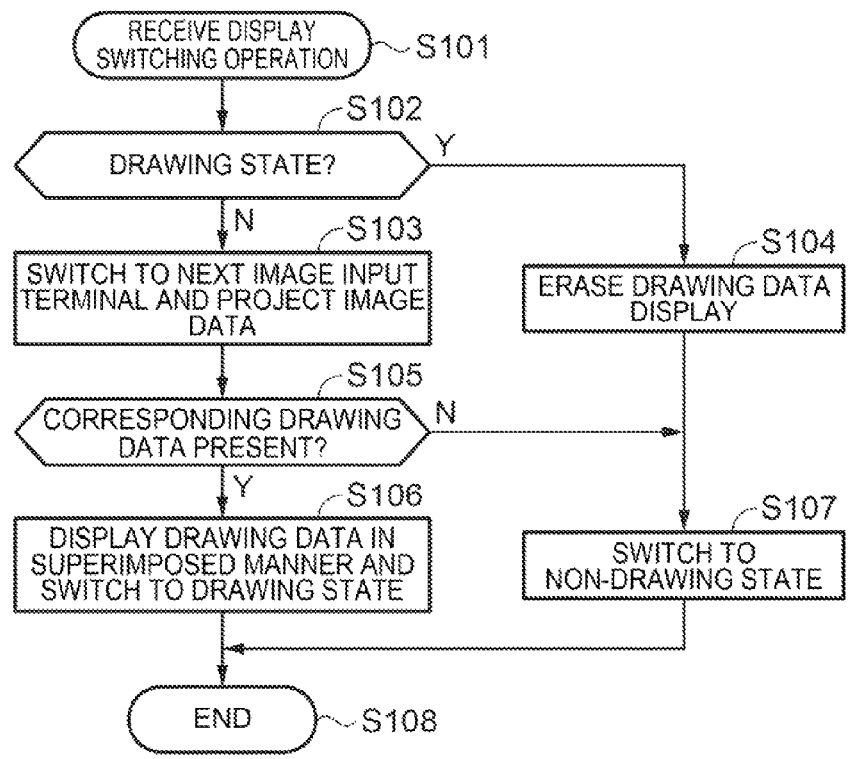
FIGS. 13A and 13B are flowchart illustrating an operation of the projector of the second embodiment.
Figure 13B:
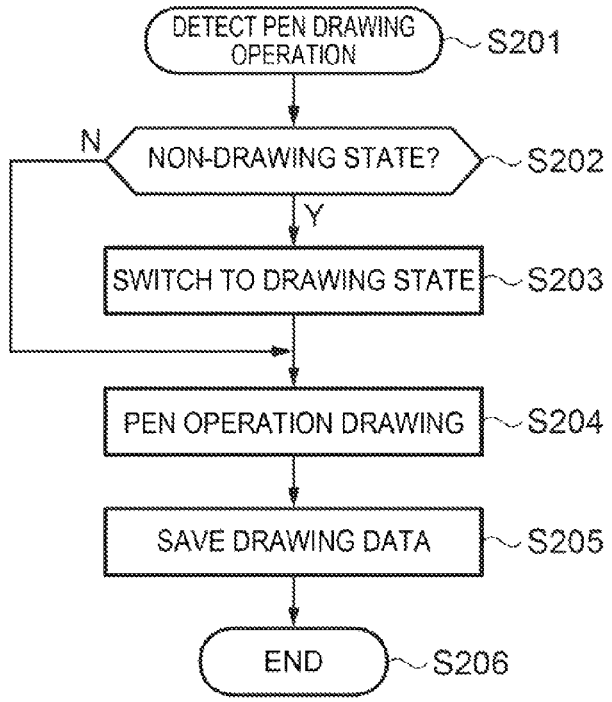

FIGS. 13A and 13B are flowcharts of the operations of the projector 5. FIG. 13A illustrates the operation when the display switching operation is accepted, and FIG. 13B illustrates the operation, when the drawing operation by the electronic pen 80 is accepted.

Operation when Display Switching Operation is Accepted

As illustrated in FIG. 13A, if the projector 5 accepts the display switching operation by the input operation device 63 during the operation (Step S101), the procedure goes to Step S102.

The Step S101 corresponds to the input operation step.

In Step 102, the control device 60 inspects whether or not the projector 5 is set to the drawing state. In the case of the drawing state (Y in Step S102), the procedure goes to Step S104. In contrast, if the protector 5 is not in the drawing state, that is, in the case of the non-drawing state (N in Step S102), the procedure goes to Step S103.

In Step S103, the control device 60 switches the terminal to the next image input terminal by the image signal input device 58, causes the image projecting device 50 to project the image data input thereto, and the procedure goes to Step S105.

In Step S104, the control device 60 erases the drawing data in the projection, and the procedure goes to Step S107.

In Step S105, the control device 60 inspects whether or not the drawing data corresponding to the image data of the image input terminal selected in Step S103 is saved in the memory device 61. In the case where the corresponding drawing data is saved (Y in Step S105), the procedure goes to Step S106. In contrast, in the case where the corresponding drawing data is not saved (N in Step S105), the procedure goes to Step S107.

In Step S106, the control device 60 reads out the drawing data corresponding to the image data of the image input terminal from the memory device 61 and projects the read out data in a superimposed manner. Subsequently, the projector 5 is set to the drawing state, and the procedure goes to Step S108.

The Step S106 corresponds to the image projection step.

In Step S107, the control device 60 switches the projector 5 to the non-drawing state, and the procedure goes to Step S108.

The Steps S101 to S107 correspond to the display switching steps.

In Step S108, this operation flow is terminated and the procedure goes back to the first process.

Operation when Projector 5 Accepts Drawing Operation

As illustrated in FIG. 13B, if the projector 5 accepts the drawing operation by the electronic pen 80 during the operation (Step S201), the procedure goes to step S202.

In Step S202, the control device 60 inspects whether or not the projector 5 is set to the non-drawing state. In the case of the non-drawing state (Y in Step S202), the procedure goes to Step S203. In contrast, if the projector 5 is not in the non-drawing state, that is, in the case of the drawing state (N in Step S202), the procedure goes to Step S204.

In Step S203, the control device 60 switches the projector 5 to the drawing state, and the procedure goes to Step S204.

In Step S204, the control device 60 causes the image projecting device 50 to operation by the electronic pen 80 project the drawing data in accordance with the drawing in a superimposed manner onto the image data (See FIGS. 12A and 12C), then the procedure goes to Step S20.

The Step S204 corresponds to the input projection step.

In Step S205, the control device 60 saves the drawing data projected in S204 in the memory device 61, and the procedure goes to Step S206.

The Step S205 corresponds to a memorizing step.

In Step S206, this operation flow is terminated and the procedure goes back to the first process.

According to the embodiment described above, the following advantages are obtained.

According to the projector 5 of the embodiment, if the display switching operation is performed when drawings (drawing data) such as characters or graphics with the electronic pen 30 are being drawn on the projected image (image data), the drawing state in which the drawing data is superimposed onto the image data to project as an image is switched to the non-drawing state in which the drawing data is not superimposed, and only the image data is projected as an image. Accordingly, since the image before drawing and the image after drawing may be switched easily in projection without the necessity of a complicated operation, these images can be compared easily.

In the case where the drawing data corresponding respectively to the image data of the plurality of image input terminals 6A and 6B are saved, and the display switching operation is performed, the display state of the image input terminals 6A and 68 is switched in the order of the drawing state and the non-drawing state respectively. Accordingly, the corresponding drawing data may be switched in projection between the image before drawing and the image after drawing for each of the images from the image input terminals 6A and 6B. Therefore, the images from the respective image input terminals 6A and 6B can be compared and confirmed with each other easily. When drawing is not performed, the image input terminals 6A and 6B may be switched by the display switching operation.

Since the above-described, advantages are achieved by using the projector 5 of the embodiment, various presentations or lessons in school may be carried forward efficiently.

The embodiment may be modified as follows.

Modification 1

In the embodiment described above, a configuration in which an image signal detection unit configured to detect whether or not the image signal is input to the image input terminals 6A and 6B may be provided, to switch only to the image input terminal having the image signal (data) input thereto.

Modification 2

In the embodiment described above, which one of the drawing state and the non-drawing state is selected may be displayed for a predetermined period after the display switching operation.

Modification 3

In the embodiment described above, the example to which the invention is applied to the projector 5 configured to project images has been exemplified. However, the technical gist of the invention is not limited to the projector 5 configured as described above. For example, by applying the invention to a display device configured to display images on a display surface, problems that the display cannot be returned back to an image before drawing for confirmation and that a complicated operation such as saving the drawing data somewhere and calling up therefrom in the case of restoring the drawing data to the state before and continuing drawing after having erased is necessary when drawings such as characters and graphics are drawn with the electronic pen 80 on a displayed image may be solved.

Braun tubes (CRT), liquid crystal displays, plasma displays, organic EL displays, head mount displays are included in the display device according to the invention.

What is claimed is:

1. A both-direction display apparatus comprising:
an image input terminal portion to which an image signal is input from an external device;
a display unit that is configured to display an image based on a display signal on a screen;
an image operation detection unit that is configured to detect an operation for the screen as an image operation;
a drawing unit that is configured to draw an operation input object corresponding to the image operation;
an output unit that is configured to output the display signal for displaying a composite image obtained by combining an external image based on the image signal and the operation input object;
an interlocking operation detection unit that is configured to detect an interlocking operation;
an interlocking editing unit that is configured to edit the operation input object so as to follow a change of the external image in accordance with the interlocking operation; and
a control device that is configured to switch a state between a drawing state in which a composite image obtained by combining the external image and the operation input object is displayed when the interlocking operation is accepted, and a non-drawing state in which the operation input object is not combined and only the external image is displayed, wherein the image input terminal portion is provided with a plurality of image input terminals, a memory device configured to save the operation input object for each of the plurality of image input terminals is further provided, and when the interlocking operation is accepted, if the state is the drawing state, the state is switched to the non-drawing state, and if the state is the non-drawing state, the terminal is switched to the next image input terminal, and the state is switched to the drawing state or the non-drawing state by the external image of the image input terminal and the operation input object.

2. The both-direction display method according to claim 1, wherein the interlocking operation is recognized by the external device as a left click operation for slide change.

3. The both-direction image display apparatus according to claim 1, wherein the interlocking editing unit outputs a device operation signal corresponding to the interlocking operation to the external device and the operation input object is edited so as to follow the change of the external image when the interlocking operation is detected.

4. The both-direction image display apparatus according to claim 1, wherein the interlocking editing unit erases the operation input object so as to follow the change of the external image when the interlocking operation is detected.

5. The both-direction image display apparatus according to claim 1, wherein the interlocking editing unit enlarges or contracts the operation input object so as to follow the change of the external image when the interlocking operation is detected.

6. The both-direction display apparatus according to claim 1, wherein the interlocking editing unit moves the operation input object so as to follow the change of the external image when the interlocking operation is detected.

* * * * *